United States Patent
Chen et al.

(10) Patent No.: US 7,386,323 B2
(45) Date of Patent: Jun. 10, 2008

(54) SYSTEMS AND METHODS FOR OPERATING A COMPUTING DEVICE HAVING IMAGE CAPTURE CAPABILITIES

(75) Inventors: Tim Tian Chen, Mount Laurel, NJ (US); Peter Burchhardt, Seattle, WA (US); Eric I-Chao Chang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 213 days.

(21) Appl. No.: 11/102,527

(22) Filed: Apr. 8, 2005

(65) Prior Publication Data

US 2006/0229099 A1  Oct. 12, 2006

(51) Int. Cl.
 *H04M 1/00* (2006.01)

(52) U.S. Cl. ............... 455/556.1; 455/403; 455/566; 455/575.1; 348/14.02; 348/240.99

(58) Field of Classification Search ............ 455/403, 455/566, 575.1, 578, 556.1; 715/808; 348/14.02, 348/240.99
See application file for complete search history.

(56) References Cited

U.S. PATENT DOCUMENTS

| | | | |
|---|---|---|---|
| 6,185,433 B1* | 2/2001 | Lele et al. | 455/528 |
| 2003/0013484 A1* | 1/2003 | Nishimura et al. | 455/556 |
| 2004/0032503 A1* | 2/2004 | Monden et al. | 348/207.99 |
| 2004/0259590 A1* | 12/2004 | Middleton | 455/556.1 |
| 2005/0164745 A1* | 7/2005 | Oe et al. | 455/566 |
| 2006/0031782 A1* | 2/2006 | Houmura et al. | 715/808 |
| 2006/0089125 A1* | 4/2006 | Frank | 455/411 |

\* cited by examiner

*Primary Examiner*—Joseph Feild
*Assistant Examiner*—David Q. Nguyen
(74) *Attorney, Agent, or Firm*—Woodcock Washburn LLP

(57) ABSTRACT

Systems and methods for operating a portable computing device having a broad set of functionality, such as image or audio/video capture capabilities, are provided. One or more specialized modes are provided in a portable computing device, such as a smart phone, for intelligently disabling any distracting functionality of the portable computing device with respect to a target subset of functionality possessed by the device and invoked during operation of a specialized mode. In various embodiments, the special mode for operation of a portable computing device in accordance with the invention is such that functionality that is likely to interfere with a time capture event of the device is disabled or mitigated during operation.

15 Claims, 11 Drawing Sheets

FIG. 1 - Prior Art

SYSTEMS AND METHODS FOR OPERATING A COMPUTING DEVICE HAVING IMAGE CAPTURE CAPABILITIES

FIELD OF THE INVENTION

The present invention provides systems and methods for operating a portable computing device having a broad set of functionality, such as image or audio/video capture capabilities.

BACKGROUND OF THE INVENTION

Personal computers and portable/mobile computing devices, such as laptop computers, Tablet computers, notebook computers, sub-notebook computers and handheld computing devices, such as MP3 players, DVD movie players, smart phones, etc., as well as other present and future variants of portable/mobile computing devices, are currently used to receive, capture and transmit messages of all kinds, e.g., voice data, music data, video or other image data, etc. Such portable or mobile computing devices will be referred to herein simply as "mobile computing devices" or "mobile devices" without limitation. For instance, mobile devices can be used in situations, such as meetings, to display a presentation on a display, such as a large format display surface, e.g., projector or monitor, in a meeting environment, or to capture images or video via a camera via a portable computing device, such as a personal digital assistant (PDA), camera enabled smart phone, MP3 player, etc.

However, as illustrated in FIG. 1, currently when a user is taking a video or a timed capture of an object O with his/her smart phone SP or other mobile device PCD, there is no protection against interruption. Thus, if a phone call, short message service (SMS), email reminder or other notification, etc. is received, the recording/capture will be unavoidably be interfered with or stopped, and this is often undesirable. For instance, imagine the horror if the object O was a wedding, and a user of a smart phone was taking a video capture of a wedding sequence of events when the smart phone rang according to a loud ringing sequence or song—substantially interrupting the wedding and interfering with or stopping altogether the time capture of video. Thus, it is critical that the task of video or image capture is prioritized over noisy or otherwise interfering functionality of the computing device during operation. Accordingly, it would be desirable to provide a special mode for operation of a portable computing device so that functionality that is likely to interfere with a capture event of interest is disabled or mitigated during operation.

SUMMARY OF THE INVENTION

In view of the foregoing, the present invention provides systems and methods for operating a portable computing device having a broad set of functionality, such as image or audio/video capture capabilities. More particularly, the present invention provides systems and methods for providing a specialized mode in a portable computing device, such as a "smart" phone, for intelligently disabling any distracting functionality of the portable computing device with respect to a target subset of functionality possessed by the device and invoked during operation of the specialized mode. In various embodiments, the special mode for operation of a portable computing device in accordance with the invention is such that functionality that is likely to interfere with a time capture event of the device is disabled or mitigated during operation.

Other features of the present invention are described below.

BRIEF DESCRIPTION OF THE DRAWINGS

The system and methods for operating computing devices are further described with reference to the accompanying drawings in which.

DETAILED DESCRIPTION OF ILLUSTRATIVE EMBODIMENTS

Overview

Figure 1:
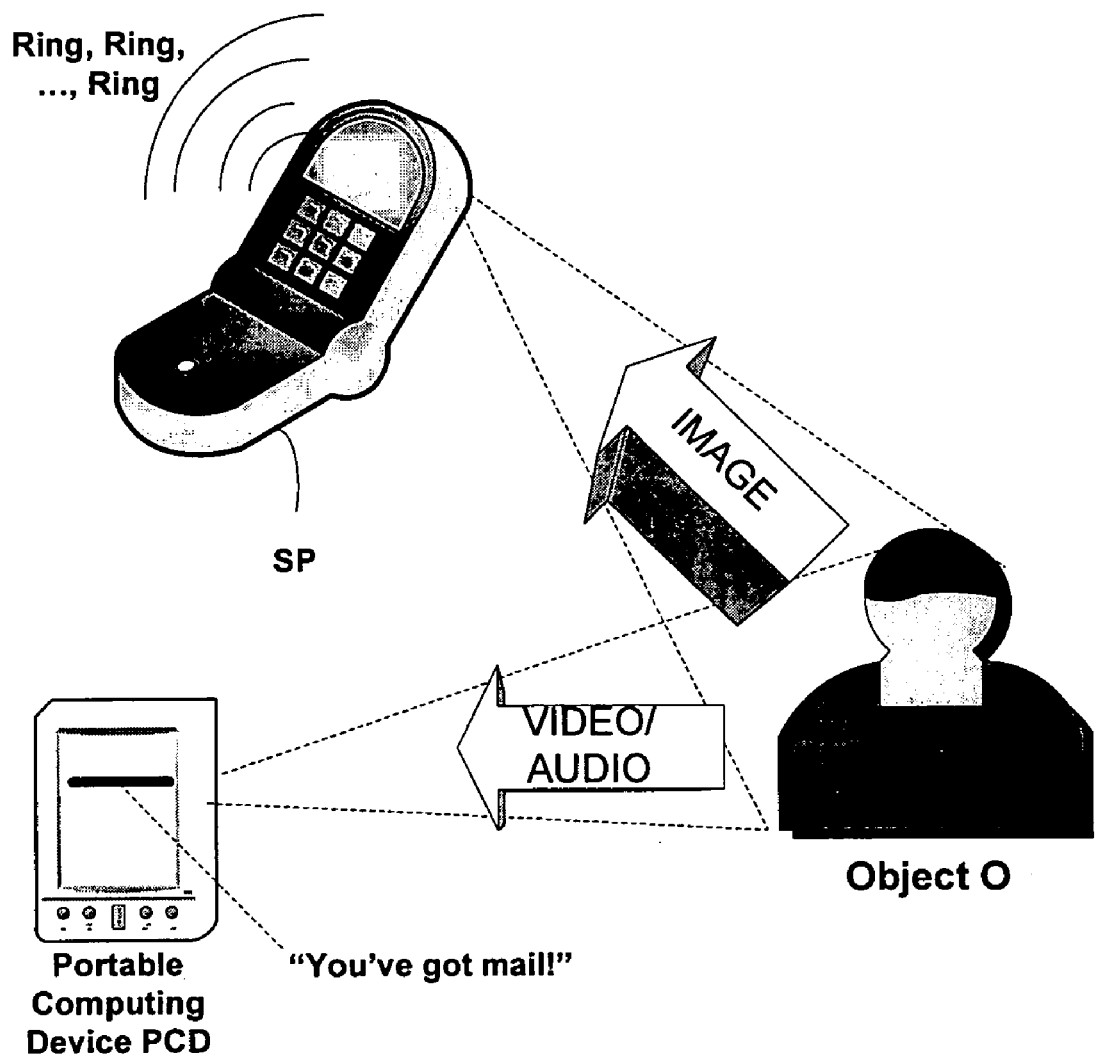
FIG. 1 is an exemplary diagram of a prior art scenario wherein secondary functionality of a device interrupts a primary time capture task of the device.

As mentioned in the background, with the increased flexibility of and the broad range of functionality being provided in modern mobile devices, consideration of the potential interaction of such broad range of functional objects and goals has not been realized because all too often, a phone call or other notification ends up interfering with such events as time capture of content with the device. Accordingly, the invention provides a separate mode of operation when a predefined primary application is being used on the portable computing device. Any secondary applications or behaviors are then subjugated to the behavior of the primary application in order to ensure the autonomous execution of the primary application without interference from the secondary applications or behaviors of the mobile device. In various embodiments, the special mode for operation of a portable computing device in accordance with the invention is such that functionality that is likely to interfere with a capture event of interest, e.g., via a camera of a smart phone, is disabled or mitigated during operation, e.g., by muting a ringer of a cell phone but allowing the call to proceed to voicemail.

Special Operation Mode for a Computing Device Having Image Capture Capabilities

In one non-limiting embodiment, the primary application is a time capture application that includes such events as video capture, or image capture (e.g., when the lens is in use), for which it is desirable to operate them without interruption. In this embodiment, a digital camera/mobile phone/PC device having a wide range of functionality, only a subset of which is desirable when using the digital camera, is operated in specialized camera mode or state of operation. Thus, the invention provides a separate mode for picture/video capturing with such a device.

When a user switches to Camera Mode (CM), the camera application is launched or otherwise readied for operation and the user can take pictures or videos as if the device were a digital camera or digital camcorder. However, incoming phone calls, SMS, Reminders, and other types of notifications become silent in accordance with the invention. Sound, vibration or popup UIs are disabled by default, though a non-obtrusive flashing indicator I, e.g., an LED, indicating some kind of notification has arrived may be engaged for a pre-defined set of notifications. For instance, a doctor or fireman may regard it particularly important to receive calls if the doctor or fireman is on emergency call duty. In such a case, it would be desirable to override the priority given to time capture and enable the user to select which notifications or other incoming message (voice or data) will nonetheless retain some of their default behaviors when not in camera mode.

However, by default, during camera mode operation (time capture), missed phone calls will go into a phone history and SMS/Emails will go into the usual inboxes. Reminders are treated as if they are snoozed until the user switches out of CM. In one embodiment, when the user turns off CM, and if there were one or more notifications missed, then a "missed notifications and messages" UI lists them upon exiting CM. As mentioned, a user may also override the prioritization schedule provided by camera mode, or create an additional mode with prioritization characteristics that make sense to the user (e.g., a doctor retaining vibration characteristics for incoming phone calls).

Thus, in accordance with the invention, when a user is taking a video or other timed capture with his/her PDA or smart phone, there is protection against interruption in the manner desired by the user. The camera mode provides a mode for the known scenario of interrupting a camera time capture, however, users are given the flexibility to create or modify behaviors associated with receiving messages, calls, notifications or other data at their mobile device. Thus, when in the separate camera mode for picture/video capturing, when a phone call (or SMS, Outlook Reminder, etc) comes in, the recording/capture is not stopped or interrupted and there is no interference in the quality of the resultant images.

Figure 2:
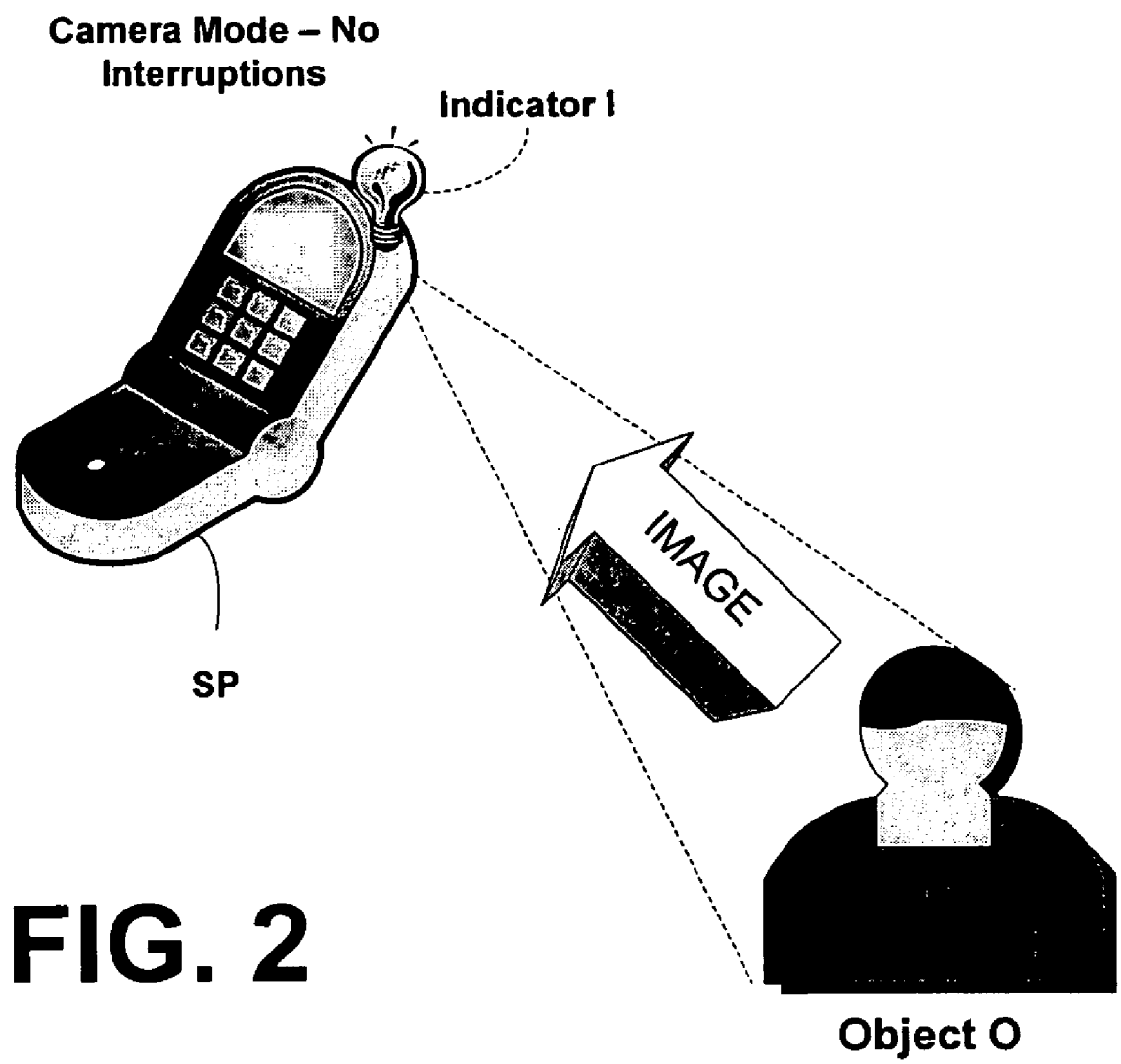
FIG. 2 is a diagram illustrating the lack of interruption of primary functionality of a mobile device by secondary functionality in accordance with the invention.

Accordingly, as shown in FIG. 2, when a user of a camera enabled mobile device SP is operating the mobile device in camera mode to take a picture or video capture of object O, no interruptions or interference with the camera capture process occurs in accordance with the invention.

Moreover, the invention provides a framework via a set of interfaces and/or an operating system to allow the addition of other modes that optimize the effectiveness of a group of applications having potentially interfering sets of functionality. Thus, the invention contemplates a series of modes in addition to current system modes (vibrate, silent, etc.), one of which may be the above-described Camera Mode (CM).

Figure 3:
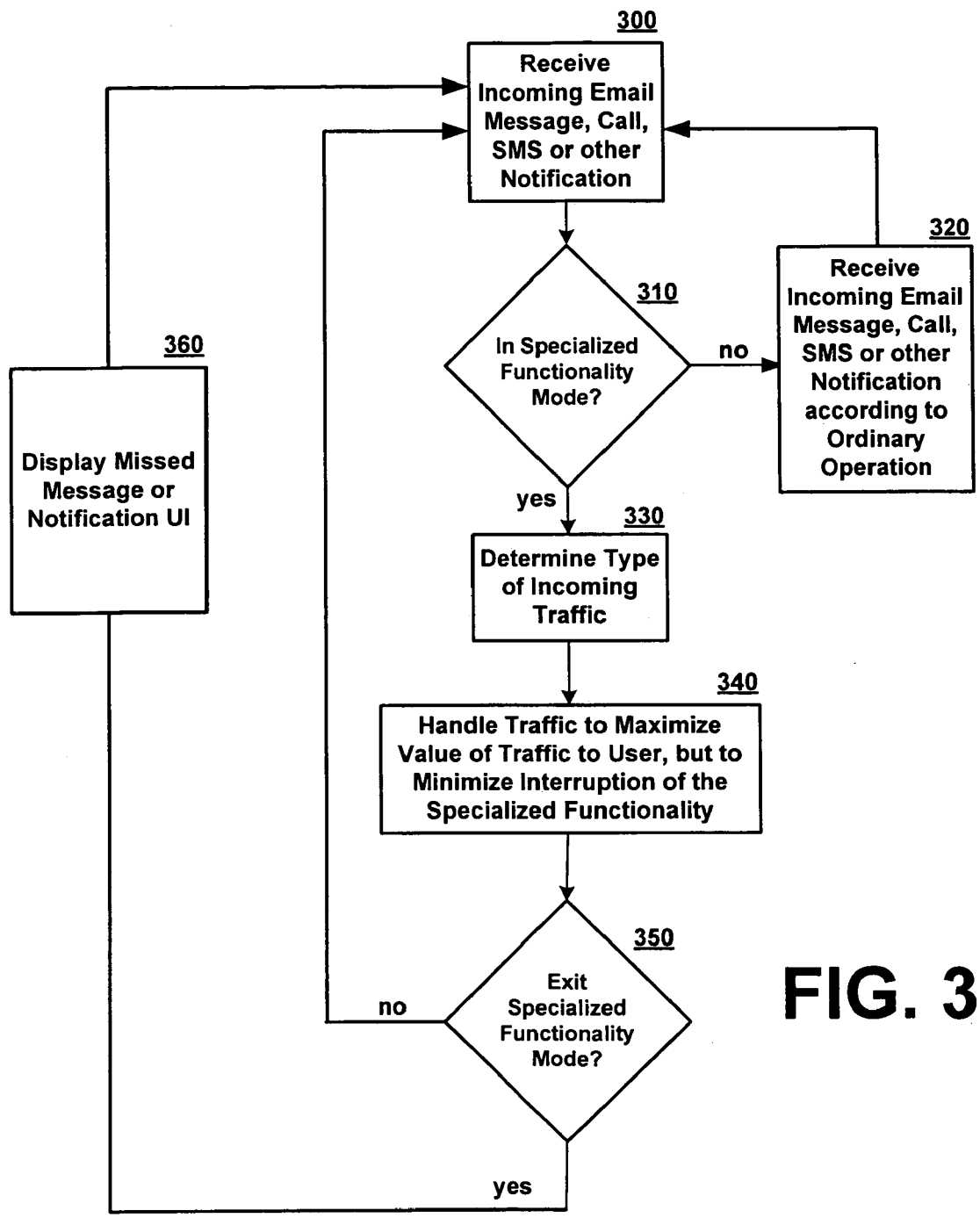
FIG. 3 is an exemplary, non-limiting flow diagram associated with handling traffic when a mobile device is in a specialized mode in accordance with the invention.

As illustrated in FIG. 3, in accordance with the invention which preserves the integrity of a primary application or functionality on a mobile device by mitigating or preventing interference from secondary applications or functionality, at 300, an event is received by the mobile device, such as an incoming email, message, call, SMS or other notification, and it is determined at 310, whether the mobile device is operating according to any specialized mode of the invention (either the above-described camera mode or a mode created or modified by the user). If not, then the event is handled as usual until the next incoming event. A user can place the mobile device into a specialized mode at any time during the flow of operation. If at 310, however, the device is in a specialized mode, then depending on the type of traffic determined at 340, the traffic is handled according to the specialized mode in a way that still preserves the value of the incoming traffic to the user (by saving the message for later, or lighting an LED indicator I), but nonetheless does not interrupt or otherwise disturb the specialized functionality of the application of interest (e.g., picture taking). At 350, if the specialized mode is still in effect, then the flow waits for more incoming traffic at 300. If the user is done with the specialized functionality of the application of interest, and the user exits the specialized mode, then optionally in accordance with the invention, at 360, a specialized display "missed message or notification" UI can be displayed listing some pre-specified metadata about the messages and notifications received (or a specified subset of interest) while the mobile device was operating in the specialized mode.

As an alternative to the notification UI, a status bar or LED indicator could indicate visually that messages and/or notifications have arrived. Thus, for instance, in one embodiment of the invention, while video is being rendered on screen while during capture, there is no change in focus of the UI away from the video to display any information to the user when incoming traffic is received. However, in another embodiment, there is a slight change of focus in the UI to display a minimal, but not full overlay, of information relating to the incoming traffic. In one embodiment, the mobile device communicates with any networks to which it is connected to appropriately inform the network that the mobile device is in the specialized mode, so that phone calls, for instance, can be directed straight to voice mail.

Figure 4A:
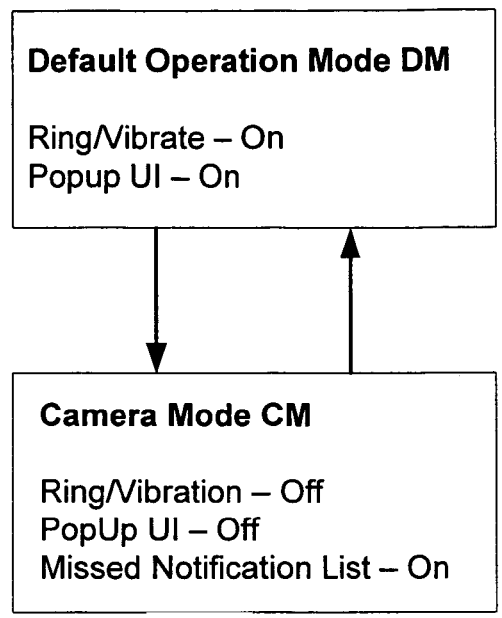
FIGS. 4A and 4B are block diagrams representing exemplary modes of operation for a mobile device in accordance with the invention.

FIG. 4A illustrates a first embodiment of the invention, described above, that provides a camera mode to supplement the default operational mode of a camera enabled mobile device. In default operation mode DM, the phone rings and/or vibrates as usual as set by the user, and Popup UI (e.g., for notifications) is enabled. However, in camera mode CM, which may be automatically entered upon engaging the lens of the camera, or may be manually set or entered by the user, ringing and vibratory activity by the phone is disabled, Popup UP is disabled, and optionally, the "missed notification or message" UI may be enabled to display the traffic missed while the user was in camera mode CM after the user returns to the default operational mode DM.

Figure 4B:
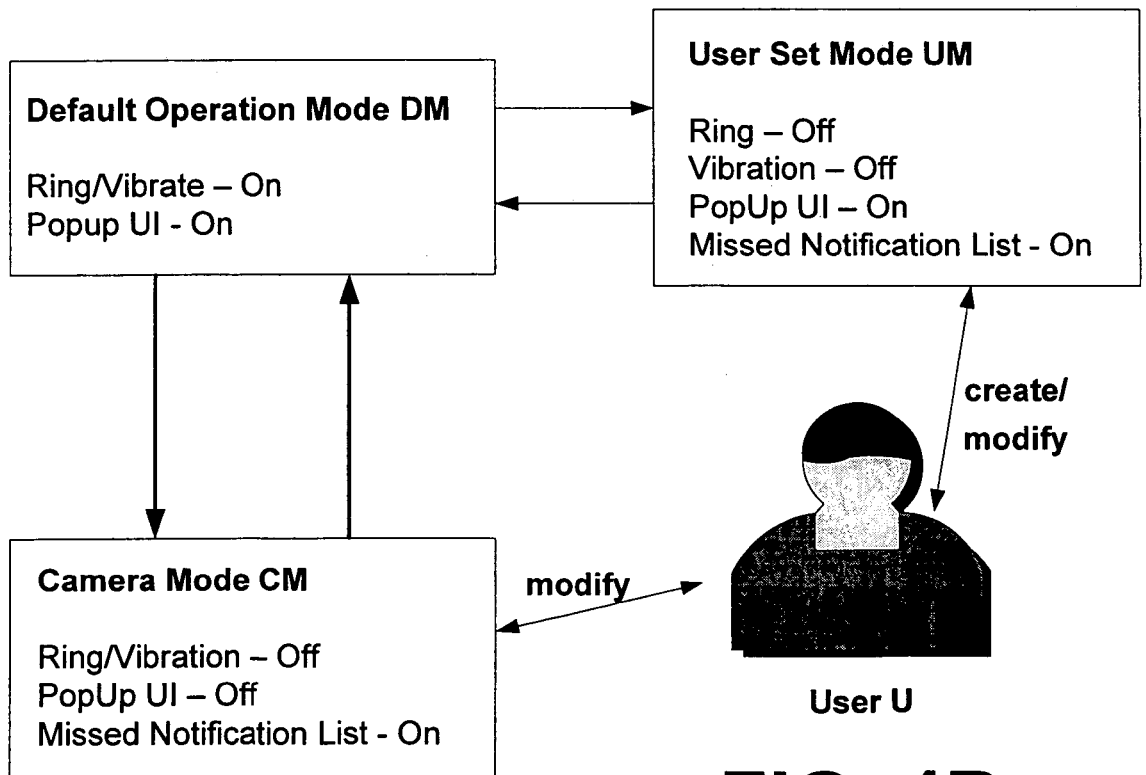

Similarly, FIG. 4B illustrates that in addition to, or as an alternative to the camera mode CM in accordance with the invention, a user may create a new user mode UM or modify an existing mode such as the camera mode CM to more closely tailor the mobile device to the user's needs. Since all of the permutations and combinations of behavioral activity cannot be contemplated for every person's needs in advance, providing a framework for favoring the functionality of a primary application and for disfavoring the functionality of any secondary applications enables a solution to be customized for each user and the user's transient needs. In the example of FIG. 4B, the user mode UM is set to a relax mode so the mobile device displays UI popups for all incoming traffic, but does not vibrate, ring or otherwise create an audible or mechanical disturbance.

Exemplary Networked and Distributed Environments

One of ordinary skill in the art can appreciate that the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with operating a mobile device in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services and processes. Mobile devices participate in a variety of networks, and thus the techniques for operating a mobile device in accordance with the present invention can be applied with great efficacy in those environments.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate the systems and methods for operating a mobile device in accordance with the invention.

Figure 5A:
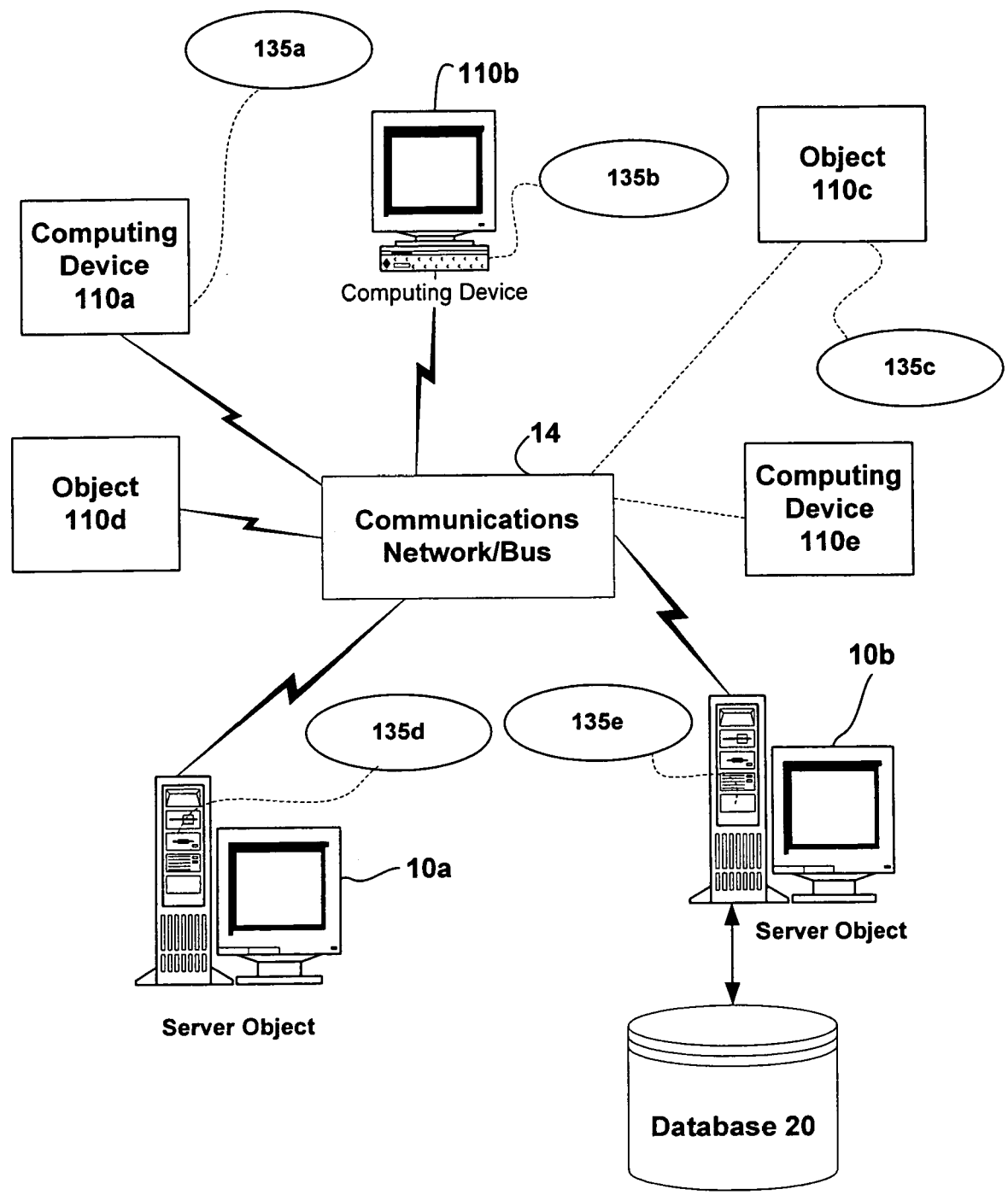
FIG. 5A is a block diagram representing a suitable computing system environment in which the present invention may be implemented.

FIG. 5A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 14. This network may itself comprise other computing objects and computing devices that provide services to the system of FIG. 5A, and may itself represent multiple interconnected networks. In accordance with an aspect of the invention, each object 10a, 10b, etc. or 110a, 110b, 110c, etc. may contain an application that might make use of an API, or other object, software, firmware and/or hardware, suitable for use with the systems and methods for operating a mobile device in accordance with the invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to operating a mobile device in accordance with the invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, moving forward, computing devices will require ways of sharing data, such as data accessed or utilized incident to program objects, which make use of the systems and methods for operating a mobile device in accordance with the invention.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 5A, as an example, computers 110a, 110b, etc. can be thought of as clients and computers 10a, 10b, etc. can be thought of as servers where servers 10a, 10b, etc. maintain the data that is then replicated to client computers 110a, 110b, etc., although any computer can be considered a client, a server, or both, depending on the circumstances. Any of these computing devices may be processing data or requesting services or tasks that may implicate operating a mobile device in accordance with the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for operating a mobile device in accordance with the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 5A illustrates an exemplary networked or distributed environment, with server(s) in communication with client computer (s) via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to prevent interference of a primary task.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

As mentioned, communications may be wired or wireless, or a combination, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135a, 135b, 135c, etc. and with connections or access to various types of storage elements or objects, across which files or data streams may be stored or to which portion(s) of files or data streams may be downloaded, transmitted or migrated. Any one or more of computers 10a, 10b, 110a, 110b, etc. may be responsible for the maintenance and updating of a database 20 or other storage element, such as a database or memory 20 for storing data processed or saved according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 5B:
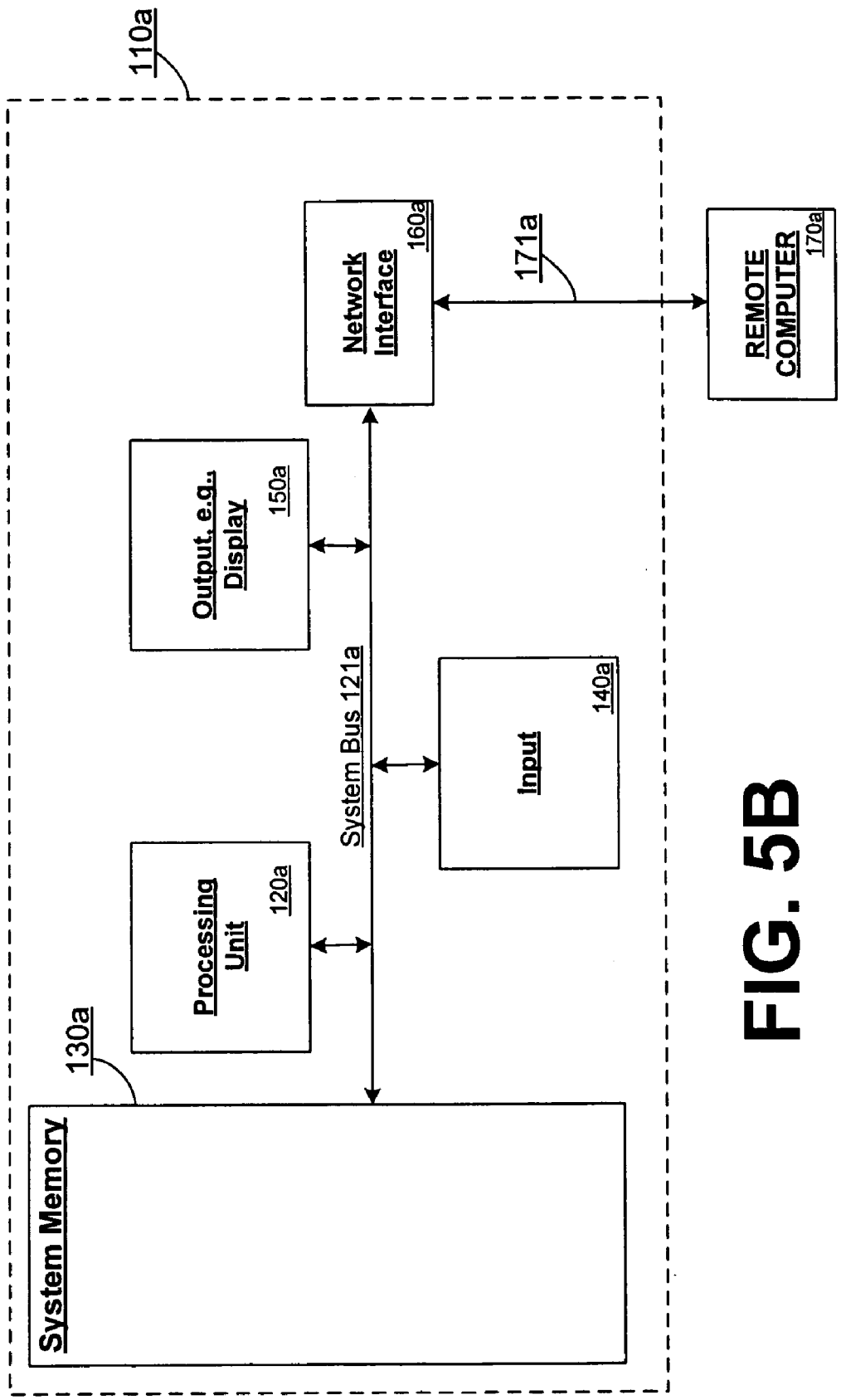
FIG. 5B is a block diagram representing an exemplary network environment in which the present invention may be implemented.

As mentioned, the invention applies to any device wherein it may be desirable to shield a primary application from interference from secondary applications of the device. It should be understood, therefore, that handheld, portable and other computing devices and computing objects of all kinds are contemplated for use in connection with the present invention, i.e., anywhere that a device may receive content according to a variety of channels. Accordingly, the below general purpose remote computer described below in FIG. 5B is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 5B thus illustrates an example of a suitable computing system environment 100a in which the invention may be implemented, although as made clear above, the computing system environment 100a is only one example of a suitable computing environment for a media device and is not intended to suggest any limitation as to the scope of use or functionality of the invention. Neither should the computing environment 100a be interpreted as having any dependency or requirement relating to any one or combination of components illustrated in the exemplary operating environment 100a.

With reference to FIG. 5B, an exemplary remote device for implementing the invention includes a general purpose computing device in the form of a computer 110a. Components of computer 110a may include, but are not limited to, a processing unit 120a, a system memory 130a, and a system bus 121a that couples various system components including the system memory to the processing unit 120a. The system bus 121a may be any of several types of bus structures including a memory bus or memory controller, a peripheral bus, and a local bus using any of a variety of bus architectures.

Computer 110a typically includes a variety of computer readable media. Computer readable media can be any available media that can be accessed by computer 110a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110a. Communication media typically embodies computer readable instructions, data structures, program modules or other data in a modulated data signal such as a carrier wave or other transport mechanism and includes any information delivery media.

The system memory 130a may include computer storage media in the form of volatile and/or nonvolatile memory such as read only memory (ROM) and/or random access memory (RAM). A basic input/output system (BIOS), containing the basic routines that help to transfer information between elements within computer 110a, such as during start-up, may be stored in memory 130a. Memory 130a typically also contains data and/or program modules that are immediately accessible to and/or presently being operated on by processing unit 120*a*. By way of example, and not limitation, memory 130*a* may also include an operating system, application programs, other program modules, and program data.

The computer 110*a* may also include other removable/non-removable, volatile/nonvolatile computer storage media. For example, computer 110*a* could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 121*a* through a non-removable memory interface such as an interface, and a magnetic disk drive or optical disk drive is typically connected to the system bus 121*a* by a removable memory interface, such as an interface.

A user may enter commands and information into the computer 110*a* through input devices such as a keyboard and pointing device, commonly referred to as a mouse, trackball or touch pad. Other input devices may include a microphone, joystick, game pad, satellite dish, scanner, or the like. These and other input devices are often connected to the processing unit 120*a* through user input 140*a* and associated interface(s) that are coupled to the system bus 121*a*, but may be connected by other interface and bus structures, such as a parallel port, game port or a universal serial bus (USB). A graphics subsystem may also be connected to the system bus 121*a*. A monitor or other type of display device is also connected to the system bus 121*a* via an interface, such as output interface 150*a*, which may in turn communicate with video memory. In addition to a monitor, computers may also include other peripheral output devices such as speakers and a printer, which may be connected through output interface 150*a*.

The computer 110*a* may operate in a networked or distributed environment using logical connections to one or more other remote computers, such as remote computer 170*a*, which may in turn have media capabilities different from device 110*a*. The remote computer 170*a* may be a personal computer, a server, a router, a network PC, a peer device or other common network node, or any other remote media consumption or transmission device, and may include any or all of the elements described above relative to the computer 110*a*. The logical connections depicted in FIG. 5B include a network 171*a*, such local area network (LAN) or a wide area network (WAN), but may also include other networks/buses. Such networking environments are commonplace in homes, offices, enterprise-wide computer networks, intranets and the Internet.

When used in a LAN networking environment, the computer 110*a* is connected to the LAN 171*a* through a network interface or adapter. When used in a WAN networking environment, the computer 110*a* typically includes a modem or other means for establishing communications over the WAN, such as the Internet. A modem, which may be internal or external, may be connected to the system bus 121*a* via the user input interface of input 140*a*, or other appropriate mechanism. In a networked environment, program modules depicted relative to the computer 110*a*, or portions thereof, may be stored in a remote memory storage device. It will be appreciated that the network connections shown and described are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., NET, includes servers, building-block services, such as Web-based data storage and downloadable device software. Generally speaking, the NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software, such as an application programming interface (API), residing on a computing device, one or more portions of the invention may also be implemented via an operating system, or a "middle man" object, a control object, hardware, firmware, intermediate language instructions or objects, etc., such that the methods for operating a mobile device in accordance with the invention may be included in, supported in or accessed via all of the languages and services enabled by managed code, such as NET code, and in other distributed computing frameworks as well.

Exemplary Interface Implementations

For any exchange of data among multiple computers, such as the exchange of traffic according to the specialized modes for a mobile device in accordance with the techniques of the invention and shared between two computers, there are interfaces for handling the various operations on each computer that can be implemented in hardware and/or software and which operate to receive, send and/or process the data in some fashion, according to the relevant applications and services being requested or provided. To the extent that one or more interface objects may be provided to achieve or implement any portion of the systems and methods for operating a mobile device in accordance with the invention, the invention is intended to encompass all such embodiments, and thus a general description of the kinds of interfaces that might be provided or utilized when implementing or carrying out the invention follows.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 6A:
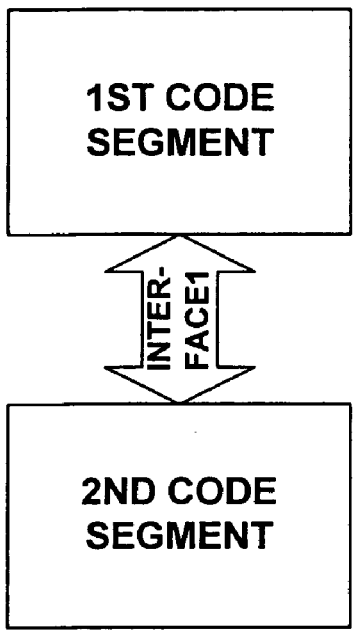
FIGS. 6A, 6B, 7A, 7B, 8A, 8B, 9A, 9B, 10A, 10B, 11A, and 11B illustrate exemplary ways in which similar interface code can be provided to achieve similar or equivalent objective(s) of any interface(s) in accordance with the invention.
Figure 6B:
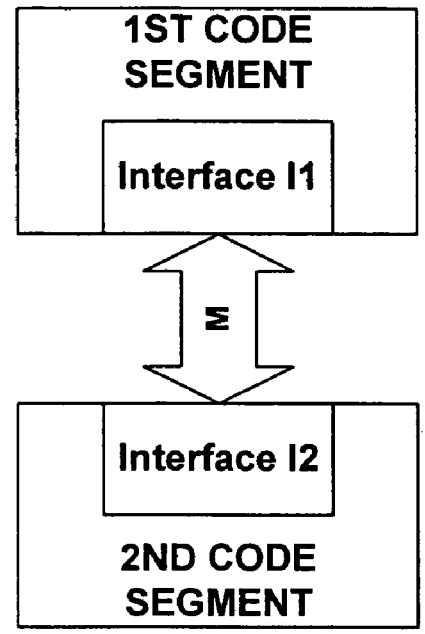

Notionally, a programming interface may be viewed generically, as shown in FIG. 6A or FIG. 6B. FIG. 6A illustrates an interface Interface1 as a conduit through which first and second code segments communicate. FIG. 6B illustrates an interface as comprising interface objects I1 and I2 (which may or may not be part of the first and second code segments), which enable first and second code segments of a system to communicate via medium M. In the view of FIG. 6B, one may consider interface objects I1 and I2 as separate interfaces of the same system and one may also consider that objects I1 and I2 plus medium M comprise the interface. Although FIGS. 6A and 6B show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 6A and 6B, but they nonetheless perform a similar function to accomplish the same overall result. We will now briefly describe some illustrative alternative implementations of a programming interface.

A. Factoring

Figure 7A:
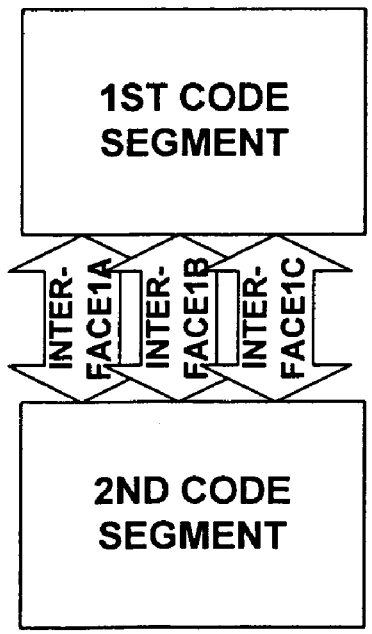
Figure 7B:
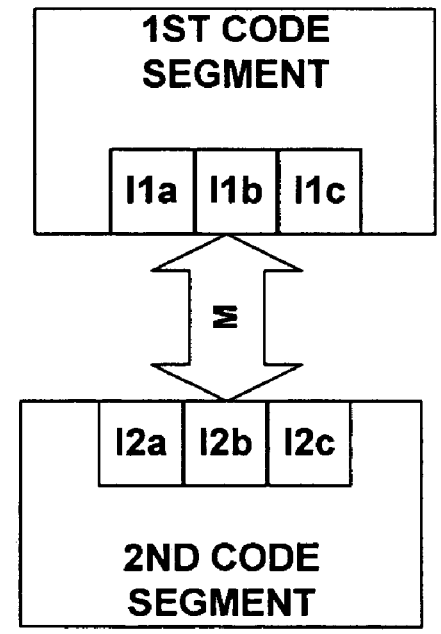

A communication from one code segment to another may be accomplished indirectly by breaking the communication into multiple discrete communications. This is depicted schematically in FIGS. 7A and 7B. As shown, some interfaces can be described in terms of divisible sets of functionality. Thus, the interface functionality of FIGS. 6A and 6B may be factored to achieve the same result, just as one may mathematically provide 24, or 2 times 2 time 3 times 2. Accordingly, as illustrated in FIG. 7A, the function provided by interface Interface1 may be subdivided to convert the communications of the interface into multiple interfaces Interface 1A, Interface 1B, Interface 1C, etc. while achieving the same result. As illustrated in FIG. 7B, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the $1^{st}$ code segment need not match the number of interfaces included with the $2^{nd}$ code segment. In either of the cases of FIGS. 7A and 7B, the functional spirit of interfaces Interface1 and I1 remain the same as with FIGS. 6A and 6B, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 8A:
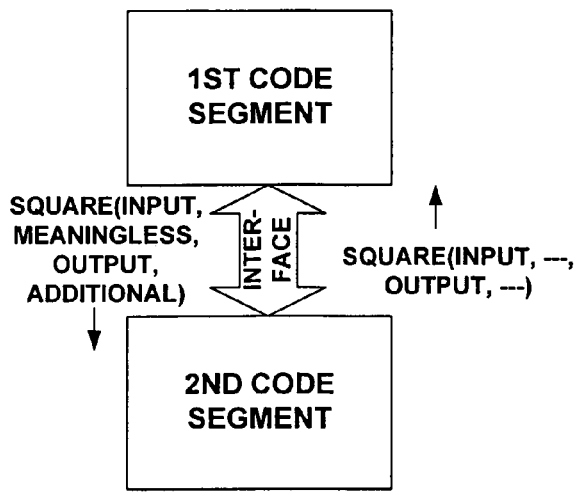
Figure 8B:
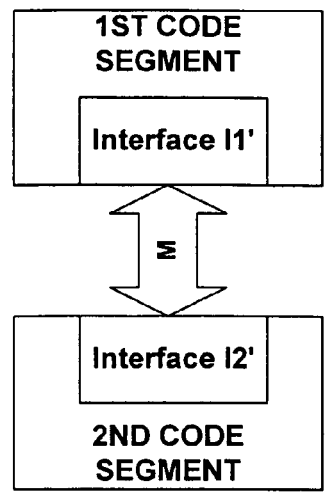

In some cases, it may be possible to ignore, add or redefine certain aspects (e.g., parameters) of a programming interface while still accomplishing the intended result. This is illustrated in FIGS. 8A and 8B. For example, assume interface Interface1 of FIG. 6A includes a function call Square(input, precision, output), a call that includes three parameters, input, precision and output, and which is issued from the $1^{st}$ Code Segment to the $2^{nd}$ Code Segment., If the middle parameter precision is of no concern in a given scenario, as shown in FIG. 8A, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 8B, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, that are not needed for some purpose, and so they may be ignored or redefined, or processed elsewhere for other purposes.

C. Inline Coding

Figure 9A:
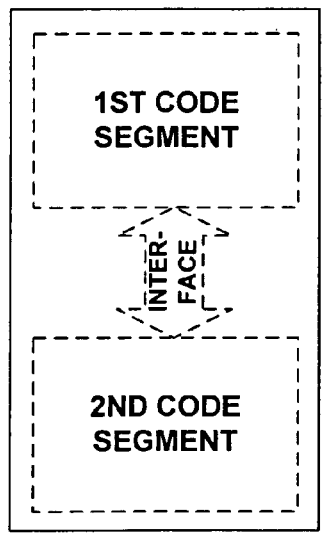
Figure 9B:
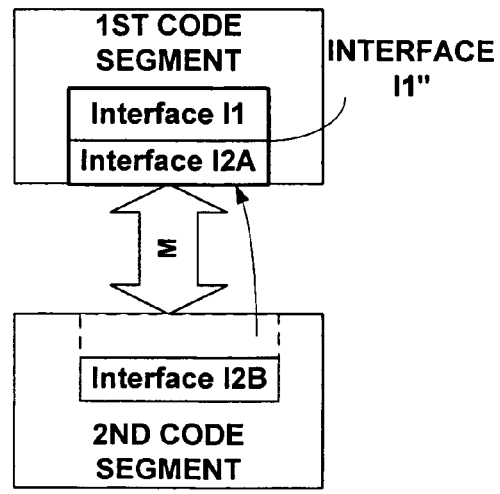

It may also be feasible to merge some or all of the functionality of two separate code modules such that the "interface" between them changes form. For example, the functionality of FIGS. 6A and 6B may be converted to the functionality of FIGS. 9A and 9B, respectively. In FIG. 9A, the previous $1^{st}$ and $2^{nd}$ Code Segments of FIG. 6A are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 9B, part (or all) of interface I2 from FIG. 6B may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 6B performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 10A:
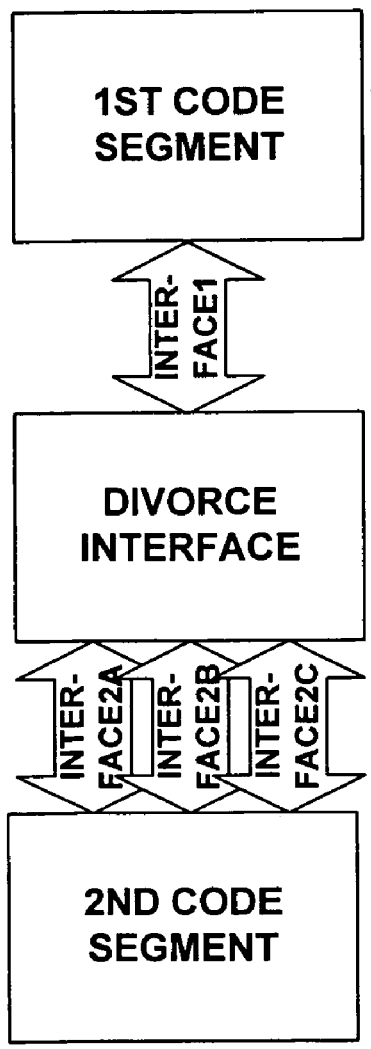
Figure 10B:
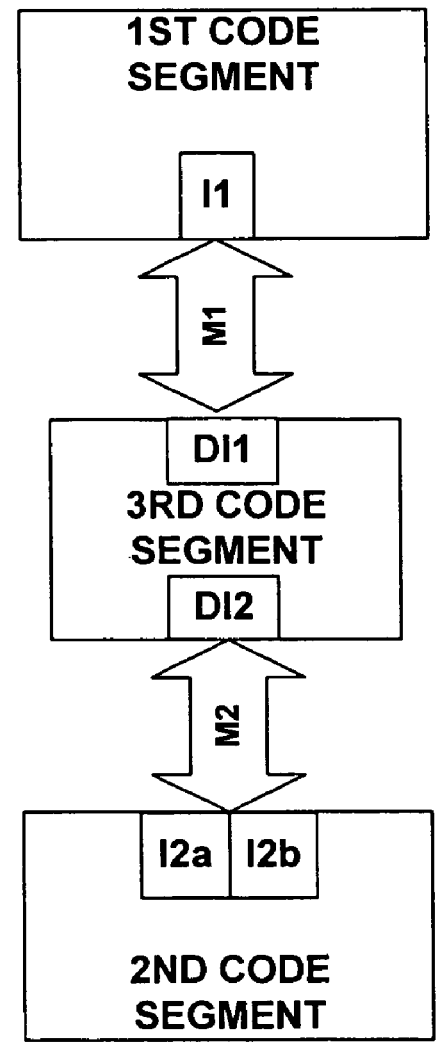

A communication from one code segment to another may be accomplished indirectly by breaking the communication into multiple discrete communications. This is depicted schematically in FIGS. 10A and 10B. As shown in FIG. 10A, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the $2^{nd}$ Code Segment is changed such that it is no longer compatible with the interface used by the $1^{st}$ Code Segment, and so an intermediary is used to make the old and new interfaces compatible. Similarly, as shown in FIG. 10B, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 6B to a new operating system, while providing the same or similar functional result.

E. Rewriting

Figure 11A:
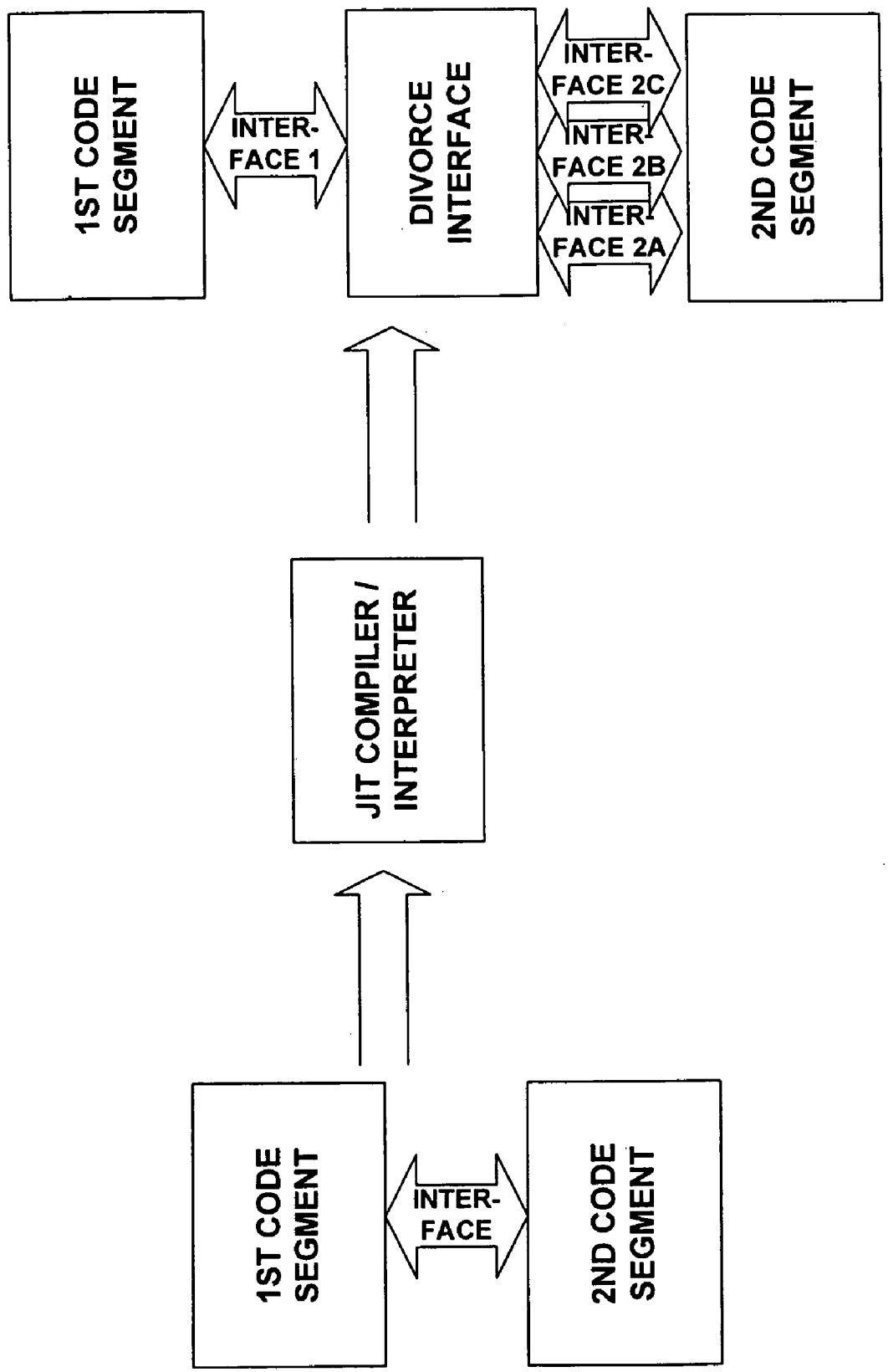
Figure 11B:
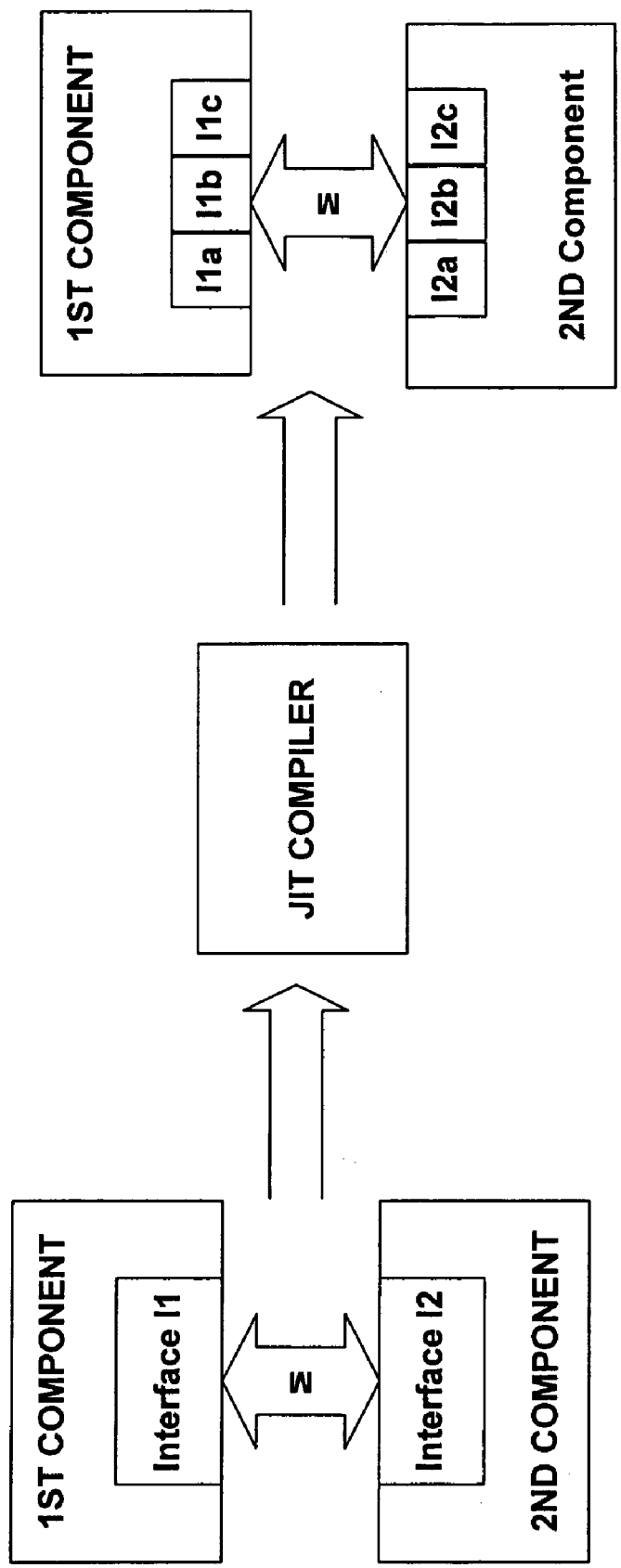

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. 11A and 11B. As can be seen in FIG. 11A, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 11B, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 6A and 6B. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

There are multiple ways of implementing the present invention, e.g., an appropriate API, tool kit, driver code, operating system, control, standalone or downloadable software object, etc. which enables applications and services to use the systems and methods for operating a mobile device in accordance with the invention. The invention contemplates the use of the invention from the standpoint of an API (or other software object), as well as from a software or hardware object that receives a variety of traffic which may be handled according to the techniques of the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to prevent interference with respect to an underlying primary application such as video or image capture with a camera. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize any interfaces of the present invention, e.g., through the use of another data processing API, controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Gaming consoles, for instance, ever on the cutting edge of fast rendering are particularly relevant to the invention as they undertake additional multimedia (voice and data) functionality and become more portable.

While exemplary embodiments refer to utilizing the present invention in the context of particular programming language constructs, the invention is not so limited, but rather may be implemented in any language to provide methods for operating a mobile device in accordance with the invention. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for operating a mobile device having a plurality of applications with different functionality, comprising:
    operating the mobile device in a specialized mode to execute a primary application having a primary functionality, wherein the specialized mode prevents interference from traffic received by other applications during operation of the mobile device in the specialized mode; and
    prior to operating the mobile device in the specialized mode, at least one of modifying or creating the specialized mode to define:
        a first subset of traffic received by other applications during operation of the mobile device in the specialized mode that is prevented from interfering with the primary functionality of the primary application; and
        a second subset of traffic received by other applications during operation of the mobile device in the specialized mode that is not prevented from interfering with the primary functionality of the primary application.

2. A method according to claim 1, wherein said operating includes operating the mobile device in a camera mode to execute a time capture application having image capture functionality, wherein the camera mode prevents mechanical or noisy interference normally created by the mobile device in response to traffic received by other applications during operation of the mobile device.

3. A method according to claim 2, wherein the camera mode prevents mechanical or noisy interference normally created by at least one of an email, an incoming phone call, a short message service (SMS) message, a popup and a notification received by other applications during operation of the mobile device.

4. A method according to claim 2, wherein the camera mode prevents ringing or vibration normally created by an incoming phone call.

5. A method according to claim 2, wherein the camera mode prevents notifications relating to an email or a short message service (SMS) message received by other applications during operation of the mobile device.

6. A method according to claim 1, further comprising:
    exiting the specialized mode and displaying a user interface that lists at least one of messages and notifications missed by the user of the mobile device during operation in the specialized mode.

7. A mobile device capable of operating in at least two mutually exclusive modes, comprising:
    a first object defining a first set of rules corresponding to a first mode for responding to traffic received by the mobile device;
    a second object defining a second set of rules, different than the first set of rules, corresponding to a second mode for responding to traffic received by the mobile device; and
    a settings component that enables a user, prior to operation of the mobile device in the first mode, to create or modify the first set of rules by defining:

a first subset of traffic received during operation of the mobile device in the first mode that is prevented from interfering with a time capture event being executed by the mobile device; and a second subset of traffic received during operation of the mobile device in the first mode that is prevented from interfering with a time capture event being executed by the mobile device;

wherein when the mobile device is placed in the first mode, the first object is consulted to determine the functional response to an item of received traffic.

8. A mobile device according to claim 7, wherein the first mode is a camera mode for carrying out image capture functionality of the mobile device, wherein the camera mode prevents mechanical or noisy interference normally created by the mobile device in response to traffic received by other applications during operation of the mobile device.

9. A mobile device according to claim 8, wherein the camera mode prevents mechanical or noisy interference normally created by at least one of an email, an incoming phone call, a short message service (SMS) message, a popup and a notification received by other applications during operation of the mobile device.

10. A mobile device according to claim 7, farther comprising a user interface component for handling the display of user interface elements, wherein when the mobile device is switched from the first mode to the second mode, the user interface component lists at least one of messages and notifications missed by the user of the mobile device during operation in the first mode.

11. A mobile device according to claim 7, further comprising:

another settings component that enables a user to create a third object having a third set of rules corresponding to a third mode for responding to traffic received by the mobile device.

12. A computer readable storage medium comprising computer executable modules having computer executable instructions for operating a mobile device having a plurality of applications with different functionality, comprising:

means for operating the mobile device in a specialized mode to execute a primary application having a specialized functionality, wherein the specialized mode prevents interruption from traffic received by other applications during operation of the mobile device in the specialized mode; and prior to operating the mobile device in the specialized mode, at least one of modifying or creating the specialized mode to define;

a first subset of traffic received by other applications during operation of the mobile device in the specialized mode that is prevented from interfering with the primary functionality of the primary application; and a second subset of traffic received by other applications during operation of the mobile device in the specialized mode that is not prevented from interfering with the primary functionality of the primary application.

13. A computer readable storage medium according to claim 12, wherein said means for operating includes means for operating the mobile device in a camera mode to execute a time capture application having image capture functionality, wherein the camera mode prevents mechanical or noisy interference normally created by the mobile device in response to traffic received by other applications during operation of the mobile device.

14. A computer readable storage medium according to claim 13, wherein means for operating the mobile device in the camera mode prevents mechanical or noisy interference normally created by at least one of an email, an incoming phone call, a short message service (SMS) message, a popup and a notification received by other applications during operation of the mobile device.

15. A computer readable storage medium according to claim 12, further comprising:

means for exiting the specialized mode and means for displaying a user interface that lists at least one of messages and notifications missed by the user of the mobile device during operation in the specialized mode.

* * * * *